July 24, 1928. 1,678,342
F. E. KLING ET AL
FURNACE DAMPER
Filed Nov. 26, 1926 2 Sheets-Sheet 2
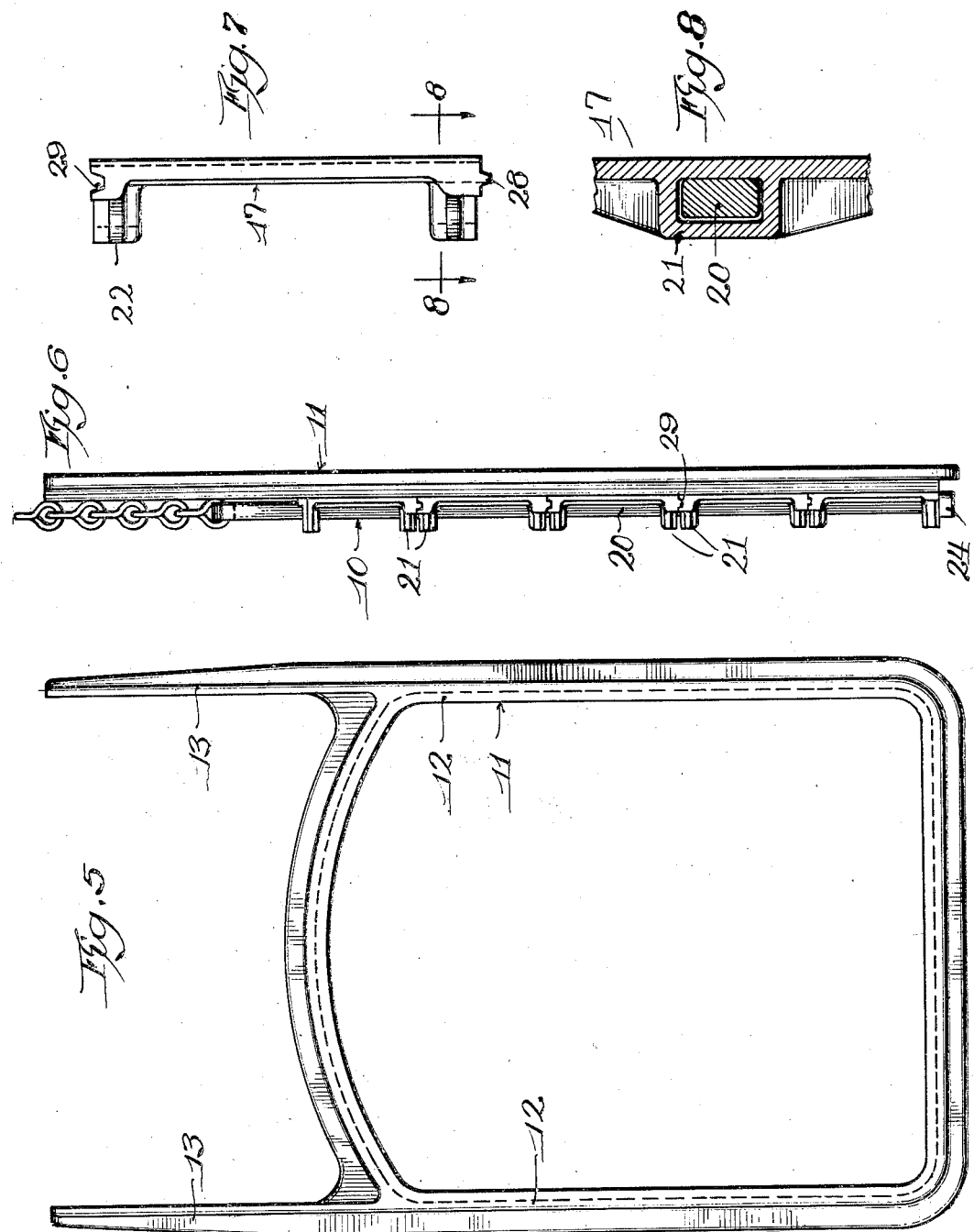

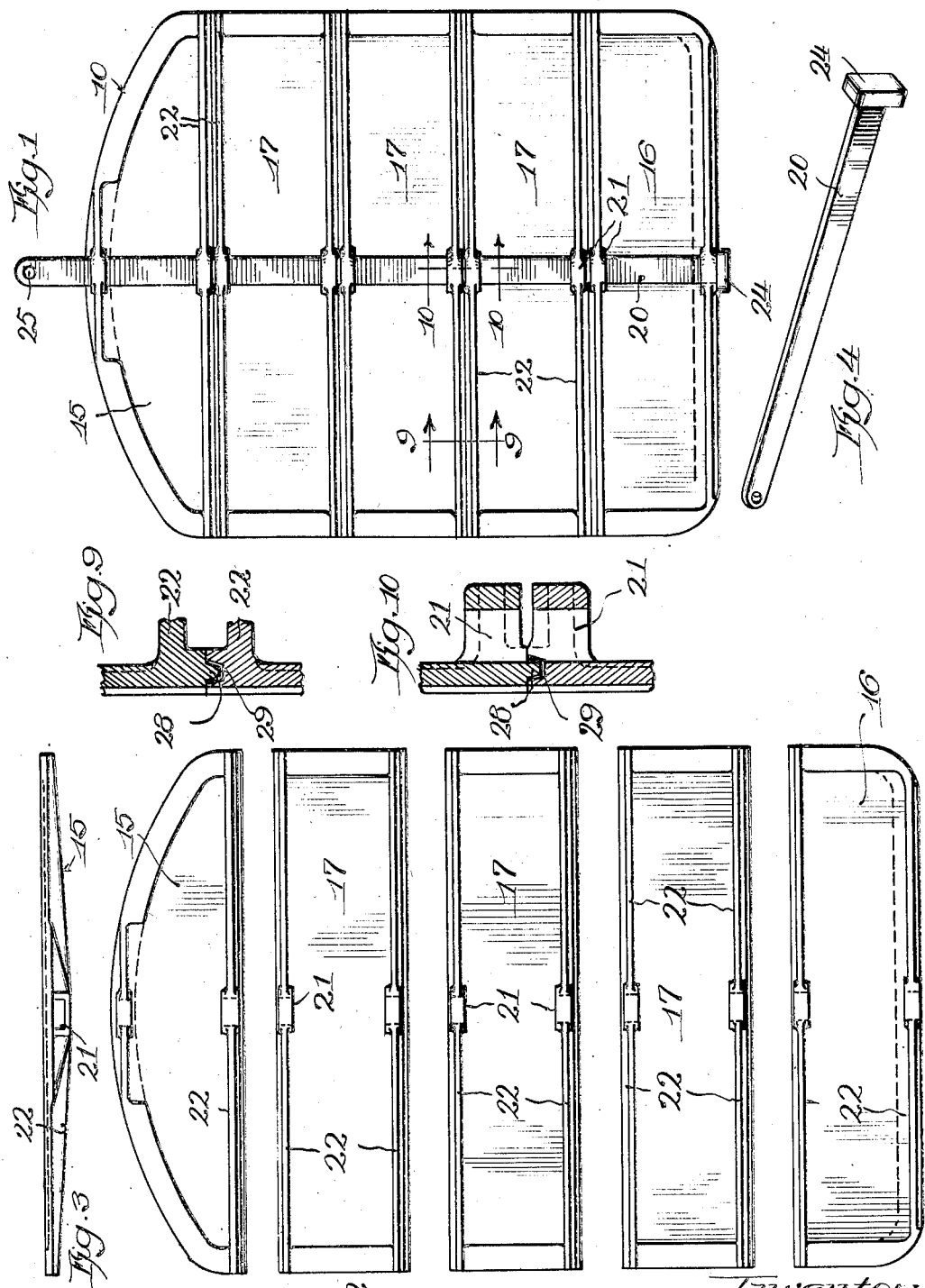

Patented July 24, 1928.

1,678,342

UNITED STATES PATENT OFFICE.

FRED E. KLING, OF YOUNGSTOWN, AND CHARLES EDWARD MALLEY, OF SPRINGFIELD, OHIO.

FURNACE DAMPER.

Application filed November 26, 1926. Serial No. 150,789.

This invention relates to improvements in dampers or gate valves for furnaces, and more particularly to gate valves for waste heat ducts used in connection with open hearth and other types of furnaces.

Heretofore, dampers or valves used for controlling the flow of hot gases in furnaces of the types above mentioned have usually been of the water-cooled type, this being generally considered necessary to avoid warping, cracking and excessive oxidation, with resulting breakage or failure of operation due to the relatively high temperatures such valve structures are required to withstand. Such water-cooled valves, however, are of necessity somewhat complicated in structure, and furthermore, are distinctly un-economical, due to the waste in heat in the form of hot water, which in most instances is discharged into the sewerage system of the plant.

In the present invention, we provide an improved form of gate valve, made up of a plurality of metallic sections arranged so as to permit freedom of expansion and contraction of each of the sections in every direction, but with all of the parts so co-related and joined together as to form a substantially gas tight barrier for the purpose intended. The main valve sections are preferably of a high heat and oxidation resisting material, such as cast steel alloys containing chromium, or nickel and chromium, said main sections being sufficiently small in proportion to the size of the entire valve surface, so as to minimize the effects of warping when in use.

The invention may best be understood by reference to the accompanying drawings, in which Figure 1 is a view of the valve member in assembled form, as seen from the rear side thereof.

Figure 2 is a somewhat similar rear view of the valve member but showing the tie rod removed and the several valve plates or sections in unassembled position.

Figure 3 is a top plan view of the upper plate or section.

Figure 4 is a view in perspective of the tie rod.

Figure 5 is a front view of a valve seat which may be used with my improved form of valve.

Figure 6 is a side view showing the valve and vale seat in normal cooperative relations.

Figure 7 is an enlarged side view of one of the intermediate valve plates or sections.

Figure 8 is a detail section taken on line 8—8 of Figure 7.

Figure 9 is a detail section taken on line 9—9 of Figure 1.

Figure 10 is a detail section taken on line 10—10 of Figure 1.

Referring to details shown in the drawings, the valve or damper is shown in assembled form in Figure 1, and indicated generally by numeral 10. A suitable seat for the valve is provided as for instance, as shown in Figures 5 and 6, in which the valve seat 11 comprises an open frame member including a plane bearing surface 12, against which the valve 10 engages. The arrangement is such that the said valve may be raised or lowered along suitable guideways 13—13 in the usual manner. It will be understood that the valve seat or frame is mounted in the heat passage or duct in the usual manner. The size of such ducts and controlling valves or dampers varying in accordance with the capacity and nature of the furnace to which it is applied. Our invention, however, is particularly adapted for controlling relatively large ducts, as for instance, those measuring three or four feet or more in vertical and horizontal dimensions, in which case the problem of minimizing the effects of expansion and warping of the gate valve at high temperatures becomes of manifest importance.

The gate member 10 is made up of a plurality of sections, including an upper section 15, lower section 16 and a number of intermediate sections 17—17. Said sections are divided along substantially horizontal lines so that each extends substantially the entire width of the valve seat or opening. The meeting edges of adjacent sections are preferably provided with a tongue and groove connection as will hereinafter more fully appear.

The sections are held together by a suitable relatively loose connection permitting expansion and contraction of said sections in all directions. In the form shown the connecting means comprises a tie rod 20, disposed vertically and centrally of the rear face of the valve member and passing through apertures 21—21 formed in flanges 22—22, projecting rearwardly and cast integral with each of the sections 15, 16 and 17. Said flanges are preferably disposed in horizontal relation to each of their respective sections, and adjacent the upper and lower margins thereof as clearly shown in Figures 1 and 2, so that each of said sections is provided with a pair of such flanges, with their centrally disposed apertures 21—21 arranged in alignment to receive the tie rod 20 in relatively loose fitting engagement therethrough. The lower end of said tie rod is provided with an enlarged base 24, adapted to engage the bottom edge of the lower valve section 16, while the upper end of said tie rod is provided with suitable connecting means such as an eye 25, by which the entire valve member may be raised or lowered through the medium of any suitable control mechanism.

A tongue and groove connection is provided between each pair of adjacent valve sections, details of which are shown in Figures 7, 9 and 10. From these figures it will be seen that the upper of two adjoining sections is provided in each instance with a tongue 28 projecting downwardly therefrom and fitting in an upwardly opening groove 29. Side walls of said tongue and groove are each preferably formed on an inwardly inclined angle, as shown. By reason of this tongue and groove connection the adjoining sections are maintained in longitudinal alignment with each other. Furthermore, any gas which at any time may escape between the joints of adjacent sections, as for instance, during expansion and contraction of the separate sections, usually carries with it a certain amount of dust, which is caught within the downwardly extending pocket formed between the tongue and groove, in sufficient quantities to form a slightly yieldable, but efficient seal against further escape of gases.

In practice each of the sections 15, 16 and 17 are formed of a single piece, preferably of cast steel alloy having relatively high heat resisting properties. Many of such alloys are well known in the art, particularly those having chromium or chromium and nickel, and having as their chief characteristic resistance to warping or excessive oxidation under high temperature conditions, such as must be withstood in devices of the character herein described.

The use and operation of our improved form of valve or damper will now be understood by those familiar with the art.

The arrangement is such as to permit each of the valve sections to readily expand or contract in all directions, and particularly in directions within the same general plane as that in which the valve body itself extends. Owing to the size and shape of the separate sections, the effects of expansion and warping are minimized so as to be negligible. The connecting means permit freedom of expansion in a vertical direction, not only of each of the sections, but of the entire damper. The tongue and groove connection between adjacent parts also permits desired freedom of expansion, and at the same time provides an effective seal against leakage at these junction points.

The valve structure above described may be utilized where water-cooling valves have heretofore been thought to be essential, our improved valve being of far simpler structure and more economical in operation than any of the heretofore used valves or dampers of the water-cooled type.

We claim as our invention:

1. In a damper, a gate member comprising a plurality of sections disposed in the same plane, and connecting means for said sections permitting freedom of expansion or contraction of said sections in said plane independently of each other, including a tie rod maintaining adjacent sections in alignment but permitting relative movement of said sections longitudinally thereof.

2. In a damper, a gate member comprising a plurality of sections disposed in the same plane, and connecting means for said sections permitting freedom of expansion or contraction of said sections in said plane independently of each other, including a tie rod maintaining adjacent sections in alignment but permitting relative movement of said sections longitudinally thereof, said sections having tongue and groove connections along abutting margins.

3. In a damper, a gate member including a plurality of separate sections extending lengthwise substantially the full dimension of said gate member in one direction, and divided along transversely extending lines, and means connecting adjacent sections at centrally disposed points along their adjacent margins, including a tie rod extending in a direction transverse to the length of said separate sections but permitting relative movement of said sections longitudinally thereof.

4. In a damper, a gate member including a plurality of separate sections extending lengthwise substantially the full dimension of said gate member in one direction, and divided along transversely extending lines, and means connecting adjacent sections at a single point along their abutting margins and permitting freedom of relative expansion of said abutting sections along the other portions of their abutting margins, said abutting margins having tongue and groove connections with each other.

5. In a damper, a gate member including a plurality of separate sections extending lengthwise substantially the full dimension of said gate member in one direction, and divided along transversely extending lines, and means connecting adjacent sections at centrally disposed points along their adjacent margins, including a tie rod extending in a direction transverse to the length of said separate sections and permitting freedom of relative movement of said sections longitudinally of said tie rod, said abutting margins having tongue and groove connections with each other.

6. In a damper, a gate member including a plurality of separate sections extending lengthwise substantially the full dimension of said gate member in one direction, each of said sections having flanged portions adjacent their abutting margins, and a tie rod extending through said flanged portions to maintain said sections in mutual alignment and permitting freedom of relative movement of said sections longitudinally of said tie rod.

7. In a damper, a gate member including a plurality of separate sections extending lengthwise substantially the full dimension of said gate member in one direction, each of said sections having flanged portions adjacent their abutting margins, and a tie rod extending through said flanged portions to maintain said sections in mutual alignment and the abutting margins of said sections having tongue and groove connections.

Signed at Youngstown this 16 day of November, 1926.

FRED E. KLING.

Signed at Springfield, Ohio, this 4th day of November, 1926.

CHARLES EDWARD MALLEY.